United States Patent [19]

Elliott et al.

[11] Patent Number: 4,659,601

[45] Date of Patent: Apr. 21, 1987

[54] ADJUSTABLE MULTILAYER THERMAL MIRROR INSULATION

[75] Inventors: Patrick H. Elliott; James L. Funk, both of Lancaster, Ohio

[73] Assignee: The Babcock & Wilcox Company, New Orleans, La.

[21] Appl. No.: 587,759

[22] Filed: Mar. 12, 1984

[51] Int. Cl.$^4$ .................. B32B 1/08; F16L 59/08
[52] U.S. Cl. ........................... 428/36; 138/148; 138/149; 138/155; 285/47; 285/302; 428/178; 428/213; 428/457; 428/920
[58] Field of Search .............. 428/36, 178, 457, 920, 428/213; 138/148, 155, 149, 134; 285/47, 302

[56] References Cited

U.S. PATENT DOCUMENTS

| | | | |
|---|---|---|---|
| 3,892,261 | 7/1975 | Hoeman | 138/149 |
| 3,904,379 | 9/1975 | Oser et al. | 285/302 |
| 3,981,689 | 9/1976 | Trelease | 138/148 |
| 4,054,158 | 10/1977 | Hoeman et al. | 285/302 |
| 4,188,761 | 2/1980 | McKay | 428/178 |
| 4,221,094 | 9/1980 | Murdock | 428/178 |

*Primary Examiner*—Paul J. Thibodeau
*Attorney, Agent, or Firm*—Robert J. Edwards; Kenneth W. Iles

[57] ABSTRACT

A size-adjustable construction element involves use of channel spacers to maintain spaced parallel relationship and positive physical contact between adjacent panel members. A preferred embodiment of the invention comprises multilayered mirror insulation having an adjustment section to permit use of a standard size component to fit nonstandard dimensions and further includes channel spacers that effectively reduce convection between adjacent layers, provide positive structural support, provide a bearing surface for ease of adjustment and maintain the parallel space relationship between adjacent sheets.

5 Claims, 10 Drawing Figures

ADJUSTABLE MULTILAYER THERMAL MIRROR INSULATION

BACKGROUND OF THE INVENTION

1. Field of the Invention

This invention relates to mirror thermal insulation and more specifically to mirror insulation having an adjustable dimension to permit use of a standard component to fit a nonstandard dimension.

2. Description of the Prior Art

The use of bright, highly reflective metallic sheets to provide thermal insulation for industrial equipment is well known. The high reflectivity of the typical aluminum or stainless steel sheets used for this insulation reduces radiation of heat from heat sources, such as pipes, panels and etc.

Mirror insulation normally comprises a plurality of parallel spaced layers, which reduces heat loss through convection and reduces the total amount of heat radiated from the entire assembly. It is important to reduce the size and number of gaps in the total insulation package to minimize convective heat loss.

Mirror pipe insulation is commonly used in the nuclear power industry, where it may be subjected to radioactive environment. In such an environment it offers substantial benefits over conventional thermal insulation, which comprises blocks of refractory material or low conductivity masses of fibrous material such as glass fibers, mineral wool, etc., because multilayered mirror insulation is much stronger and the open structure of the insulation permits easy cleaning of its interior. These advantages coupled with efficient insulating properties have lead to enthusiastic commercial acceptance of reflective mirror insulation, particularly in the nuclear power industry.

Commercial use of such insulations, however, has also created serious problems of fabrication and installation, resulting from the very structure of the insulation itself. Fibrous or ceramic insulations are generally cut to fit pipes or other objects to be insulated on the job site with simple tools such as portable saws. The complex metallic structure of multilayer mirror insulation, in contrast, virtually requires that it be fabricated in a sheet metal shop where tolerances and quality can be controlled more closely and then transported to the job site for installation. Naturally, production efficiency is higher when such insulation is manufactured in standard sized units. Sometimes, however, reflective mirror insulation is custom designed and built from construction drawings of the objects to be insulated supplied by the builder. Even then, however, the insulation units do not exactly fit because the field structures do not conform exactly to the engineering drawings. In either case a unit of reflective mirror insulation must be completely built especially for the nonstandard dimension required, or modified prior to installation.

It has been suggested that this problem of misfitting parts could be resolved by working directly from dimensions taken in the field. Taking such dimensions is, however, extremely time consuming and substantially delays completion of construction projects because fabrication of reflective mirror insulation according to this method cannot begin until the structure to be insulated is complete.

The problem also hinders attempts to design and manufacture standard sizes of insulation. At least some sections of insulation must be individually tailored to a particular size, placing reflective insulation at a disadvantage compared to ceramic or fibrous insulations that can be stockpiled and readily cut to size on the job site. Consequently, it would be of considerable benefit to provide a reflective mirror insulation whose size can be adjusted.

One effort in this direction is disclosed in U.S. Pat. No. 3,892,261 to Hoeman. Hoeman '261 discloses a multilayered reflective mirror insulation for a pipe. The length of the insulation is expandable. Expansion is achieved by pulling each end of the insulation sheet. Each layer of insulation includes an adjustable mid-section comprising a splice piece set composed of two spaced parallel metal sheets fixed to one layer to form a female extension member. The corresponding abutting layer from the other end of the adjustable section slips between the two layers of the splice piece set, forming a sandwich. The sandwich construction was designed to reduce convection around the joints formed where the respective layers abut and to increase the rigidity and strength of the structure. Only the frictional engagement of these layers and splice piece sets holds the layers in their proper parallel spaced relationship throughout the length of the adjustment. Adjustable mirror insulation units according to this invention were built, but were employed sparingly because manufacture of the unit is extremely labor intensive and expensive since it calls for many welds and very close tolerances. In addition, convective heat loss through the joints was much greater than anticipated or acceptable because mere frictional engagement in the multilayered sections was not sufficient to maintain proper spacing between adjacent layers and maintain a relatively air tight seal at the interface of a layer and a mating splice piece set. Maintaining proper alignment of these joints when the insulation is rolled to enclose a pipe is exceedingly difficult.

A significantly later attempt to address these problems is disclosed in U.S. Pat. No. 3,904,379 to Oser. Oser '379 likewise discloses an adjustable multilayered mirror pipe insulation. In Oser '379 each layer is kept in its proper parallel spaced relationship to the others by cone shaped projections or stand-offs. In the adjustment portion, however, only the frictional engagement of abutting overlapping layers and the inherent rigidity of each layer maintains the proper spaced relationship, as well as the frictional engagement of the overlapping layers. A plurality of bolts penetrates all layers of insulation in the adjustment section to secure the insulation in its adjusted position after installation. To permit pull-apart adjustment with the bolt in place, and to prevent pulling the insulation completely apart, each layer includes a longitudinal slot. Although Oser '379 discloses a simpler structure than Hoeman '261, Oser '379 suffers from similar difficulties. The bolts that penetrate all layers of the insulation conduct much heat from the heat source by providing a direct path from the heat source to the ambient air. Slots throughout the length of permitted adjustment invite large convective heat losses. Similarly, the direct contact between overlapping insulation layers is only maintained by the rigidity of the layers themselves. In installation and operation they are extremely likely not to retain the neat precisely aligned arrays illustrated in the drawings, but to separate moderately, permitting further convective heat loss. The largest single disadvantage of such adjustable mirror insulation is the extraordinarily high heat loss in the adjustment section. Oser '379 patent suffers more from this defect than other prior art solutions to these difficulties.

Furthermore, in these prior art approaches, the insulation could only be expanded. Only with great difficulty and resultant substantial reduction in insulating properties could the insulation be contracted. Thus, if workers expanded a unit of adjustable insulation too much to fit in a given application, it could quite likely be ruined and require complete replacement.

Accordingly, there is a clear need for an improved adjustable multilayered reflective mirror insulation that can be expanded or contracted, that is less labor intensive to manufacture and thermally insulates better, and withstands mishandling during shipment and installation better than the prior art.

SUMMARY OF THE INVENTION

Therefore it is an object of the present invention to provide an adjustable multilayer thermal mirror insulation unit that can be expanded or contracted within a given adjustment range.

It is a further object of the present invention to provide an adjustable mirror insulation unit that can be adjusted more than once.

It is a further object of the present invention to provide an adjustable mirror insulation unit whose insulating properties approach those of nonadjustable mirror insulation more closely.

It is a further object of the present invention to provide an adjustable mirror insulation unit that is simpler to build and less costly than comparable units of the prior art.

It is a further object of the present invention to provide an adjustable mirror insulation that can be readily installed and adjusted in the field with a minimum of skilled labor.

In accordance with these and other objects of the invention, the present invention provides an adjustable section for a size-adjustable construction element comprising a first panel member, a second panel member overlapping the first panel member, a first plurality of channel spacers attached to the first panel member on one surface thereof, a second plurality of channel spacers attached to the second panel member on the surface thereof that is opposed to the surface to which the first channel spacers are attached, and means for retaining the panel members in fixed relation to each other after adjusting the size of the element.

Each section of the adjustable mirror insulation according to the present invention includes an inner plate, adjacent the body to be insulated, and an outer plate defining the outer boundary of the adjustable mirror insulation. A plurality of spaced parallel reflective sheets is disposed between the inner plate and the outer plate. The reflective sheets are typically made from polished aluminum or stainless steel sheets. Typically the reflective sheets are of uniform thickness ranging from about 0.001 inches to 0.006 inches, with thicknesses of about 0.002 inches or about 0.004 inches being preferred. The inner case and outer case are generally thicker to provide greater structural rigidity and in general to protect the thinner sheets between them. Thickness of the inner case, for example, has a minimum thickness of about 0.015 inches and the outer case has a greater thickness to better withstand damage. Although adjustable mirror insulation may include as many sheets as desired, typically the number of sheets varies from about five to about ten, with about six sheets being a preferred number in many applications.

It is important that these multiple layers or sheets be kept in their proper spaced parallel relationship to each other to minimize heat loss. Spacing between sheets, including the outer and inner cases, is maintained by a plurality of spacers, which may be attached to each sheet. Oser, U.S. Pat. No. 3,904,379 discloses one method of keeping the layers parallel. A simple method, which may be used in the present invention, is disclosed in U.S. Pat. No. 4,054,158 to Hoeman, in which strips of corrugated foil are spot welded to one surface of each sheet. The preferred spacer means for use with the present invention comprises a corrugated foil strip mounted on its edge and fastened to one side of each sheet, as disclosed in U.S. Pat. No. 4,221,094 to Murdock. The spacer of Murdock '094 permits sheets of insulation to be bent into the desired shape easily.

Adjustment is achieved by the present invention by overlapping of the ends of corresponding layers. The adjustment portion of the unit may conveniently be located near the midsection of the unit, although other relative locations may be used instead. Spacers according to the prior art cannot be used to maintain proper spacing between adjacent sheets in the adjustment portion because such spacers gouge into the layers, causing distortions in the metals, improper adjustment, improper alignment of adjacent layers relative to one another, punctures and tears. Consequently, none of the prior art described above includes spacers of any type in the adjustment portion of the mirror insulation unit.

The present invention overcomes this difficulty by providing a plurality of channel spacers between adjacent layers of insulation. The channel spacer is as long as the adjustment portion of the adjustable mirror insulation unit and lies along the direction of adjustment. The channel spacers also provide an effective seal against convection between adjacent layers, maintain the appropriate and correct spacing between adjacent layers, and perhaps most importantly maintain frictional engagement between the overlapping portions of different layers, dramatically reducing convection losses generated in solutions according to the prior art.

Naturally, the amount of adjustment available is a matter of choice and convenience for the inventor, but typically an adjustment of one foot has been found satisfactory for many applications.

The various features of novelty that characterize the invention are pointed out with particularity in the claims annexed to and comprising part of the specification. The accompanying drawings and the detailed description below thoroughly illustrate and decribe the preferred embodiments of the invention and the best mode known to the inventor.

DETAILED DESCRIPTION OF THE PREFERRED EMBODIMENTS

Figure 1:
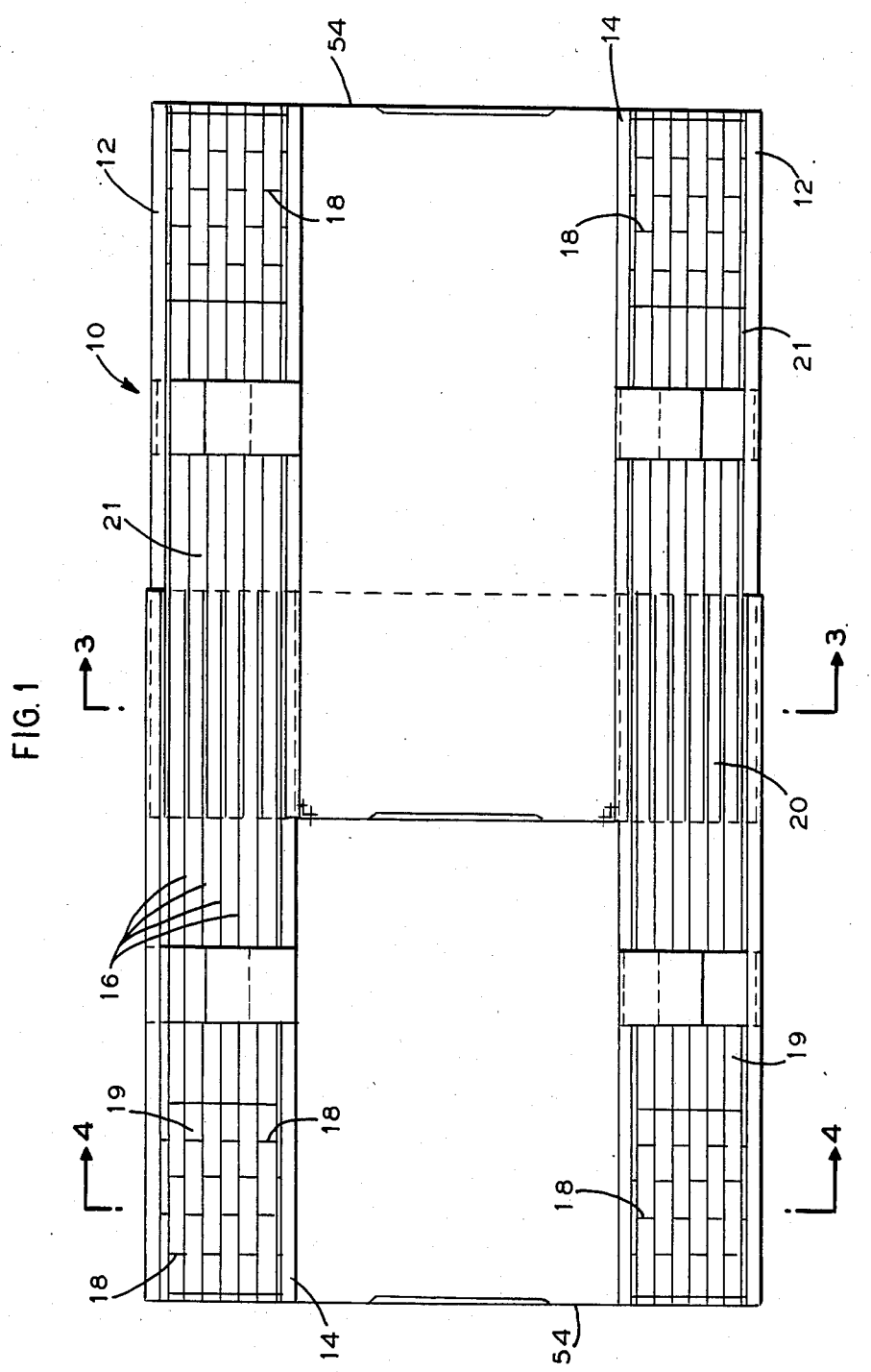
FIG. 1 is a sectional elevation of an adjustable mirror insulation according to the present invention for a pipe.
Figure 7:
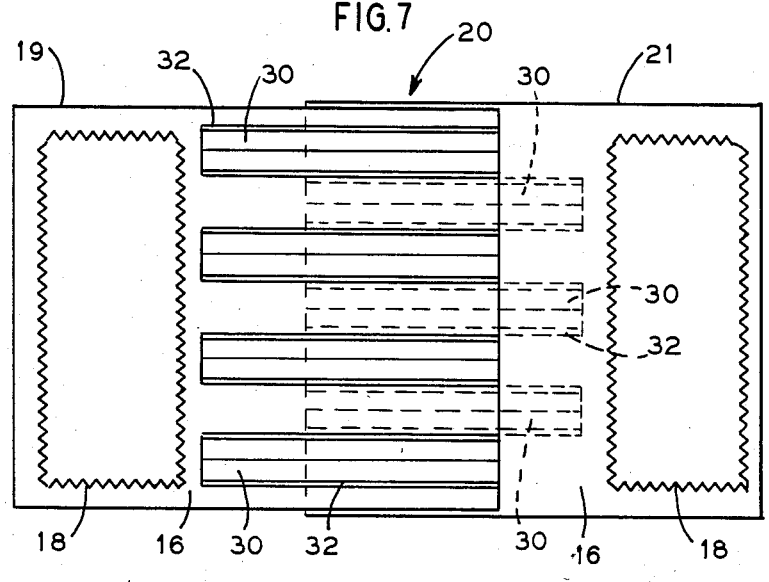
FIG. 7 is a plan view of the adjustment portion of the adjustable mirror insulation unit according to the present invention, illustrating the unit in its fully contracted state.
Figure 8:
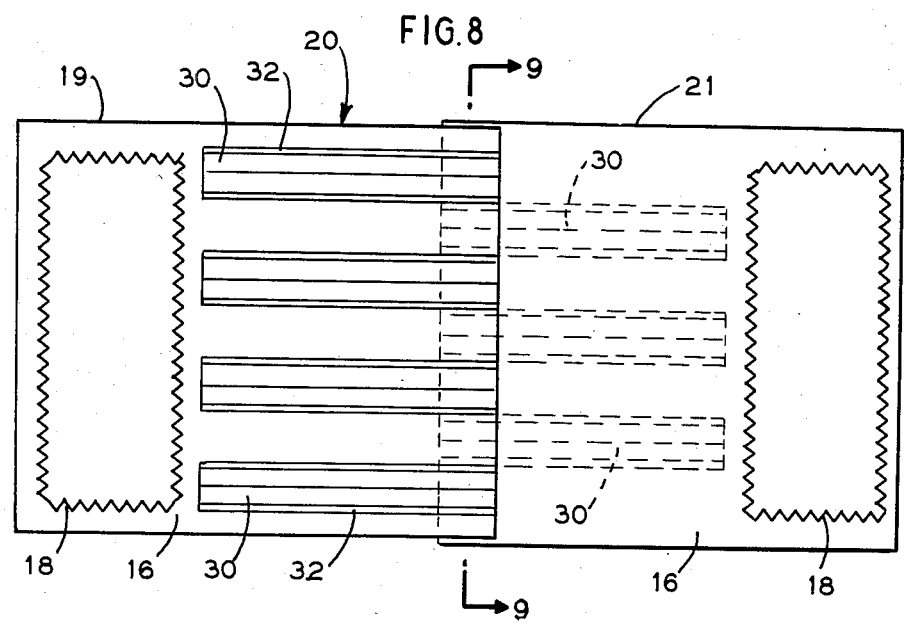
FIG. 8 is a plan view, partially in section, of the structure of FIG. 7, shown in its fully expanded state.

Referring to FIG. 1, the invention comprises adjustable mirror insulation unit 10 having outer case 12, inner case 14 and a plurality of reflective sheets 16, which may be any desired number but is six in the preferred embodiment illustrated, making a total of eight layers of insulating material in adjustable mirror insulation unit 10. Spacers are disposed between adjacent layers of insulating material to maintain the spaced parallel relationship between adjacent layers, to increase structual rigidity, and to reduce convection heat losses. In a preferred embodiment, these spacers are corrugated foil strips 18, as disclosed in Murdock's U.S. Pat. No. 4,221,094. Corrugated foil strips 18 are mounted on their edge on a surface of each reflective sheet 16, so that as viewed in FIG. 1 only the vertical line formed by the corrugation bend in corrugated foil strip 18 is visible. In a preferred embodiment one corrugated foil strip 18 is disposed in a rectangular pattern on one surface of each reflective sheet 16, as illustrated in FIGS. 7 and 8. Such spacers cannot be used in the adjustment portion of adjustable mirror insulation unit 10.

Figure 2:
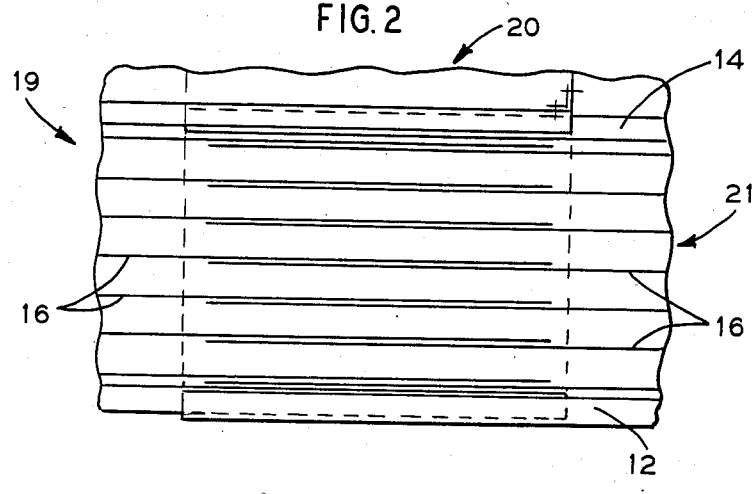
FIG. 2 is an enlarged sectional elevation of the adjustment portion of the adjustable mirror insulation of FIG. 1, showing the sliding relationship of layers relative to one another.

FIG. 2 illustrates the overlapping sliding engagement of the ends of reflective sheets 16, outer case 12 and inner case 14 in the adjustment section of adjustable mirror insulation unit 10, illustrated in FIG. 1 and designed for insulating a pipe. Adjustment is accomplished by constructing adjustable mirror insulation unit 10 in first section 19 and second section 21, which are joined at a section intermediate their two ends, as illustrated in FIG. 2. Adjustment portion 20 may conveniently be located at about the midpoint of adjustable mirror insulation unit 10, but may be located at any convenient point. Each respective layer of first section 19 rests on the top surface of the corresponding layer of second section 21 in sliding engagement therewith, permitting adjustment of adjustable mirror insulation unit 10. In a preferred embodiment, the total adjustment portion is approximately 15 inches long and permits a total adjustment of approximately 12 inches, so that when adjustable mirror insulation unit 10 is fully extended first section 19 and second section 21 overlap about three inches to provide increased structural strength and reduced convective heat losses.

Figure 10:
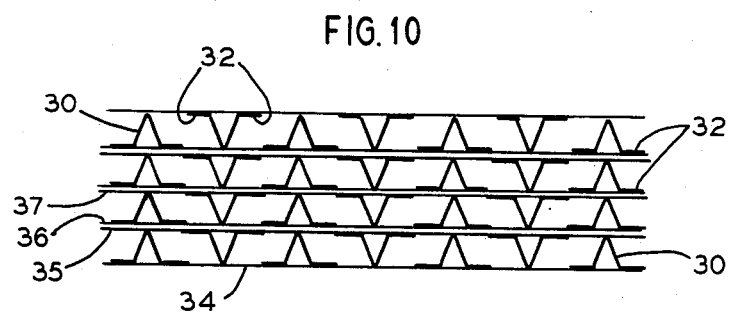
FIG. 10 is a sectional side elevation of the adjustment portion of a flat panel according to the present invention.

In conventional expandable mirror insulation, only the friction of abutting or joining sheets seals the unit against convective heat losses and provides structural support. The present invention provides positive support for each overlapping layer in the form of a channel spacer having a longitudinal axis that is oriented in the direction of adjustment. A plurality of channel spacers is attached to one surface of each sheet in adjustment portion 20 of adjustable mirror insulation unit 10. These channel spacers may assume any convenient shape, such as a U-shaped channel spacer, and I-beam shaped channel spacer, and so forth, as long as it provides a bearing surface that facilitates the sliding relationship among reflective sheets 16, outer case 12 and inner case 14. In a preferred embodiment, the channel spacers comprise channel V-spacers 30, preferably including flanges 32 at the top of each leg of the V-shape of channel V-spacer to permit ready attachment of channel V-spacer 30 to reflective sheet 16 by means such as welding. In the preferred embodiment, flanges 32 run throughout the length of channel V-spacers 30. As illustrated in FIG. 10, in a preferred embodiment the top surface of bottom layer 34 includes four channel V-spacers 30 welded to it, and naturally pointing upwardly. Layer 35 includes three channel V-spacers 30 welded to it pointing downwardly and fitting in between the four channel V-spacers 30 of bottom layer 34. Third layer 36 lies flush against second layer 35 in sliding relationship thereto. Third layer 36, like first layer 34, has four channel V-spacers 30 welded to it and naturally pointing upwardly. Fourth layer 37 includes three channel V-spacers 30 welded to it, naturally pointing downwardly, which fit in between channel V-spacers 30 of third layer 36. This pattern is repeated throughout adjustment portion 20. Naturally any other similar pattern may be employed, the primary objectives being to provide bearing surfaces for permitting smooth movement of opposing layers relative to one another, to maintain firm mechanical support for layers in adjustment portion 20, to maintain spaced parallel relationships in adjustment portion 20 and to reduce convective heat losses between reflective sheets 16.

Figure 9:
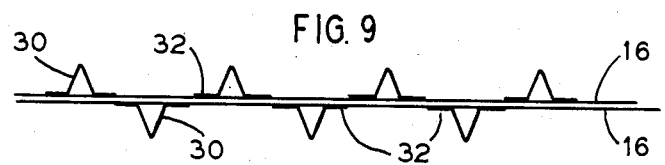
FIG. 9 is a sectional view taken along line 9—9 of FIG. 8 showing the overlapping adjustment portions of two flat panels with channel V-spacers.

The plan views of FIGS. 7 and 8 clearly illustrate the overlapping relationship of two reflective sheets 16 and the spaced mutually parallel relationships of channel V-spacers 30, that slide longitudinally relative to one another in a plurality of alternating male and female relationships. FIGS. 7 and 8 may represent either a single panel comprising two reflective sheets 16, or a stack of such panels. FIGS. 7 and 8 also may illustrate a flat insulating panel, a shape that has many applications. By bending such a flat panel, the pipe insulating embodiment of FIG. 1 is created. FIG. 9 illustrates the sliding relationship between the two reflective sheets 16 of FIGS. 7 and 8, and illustrates the arrangement of channel V-spacers 30 on those reflective sheets.

Figure 3:
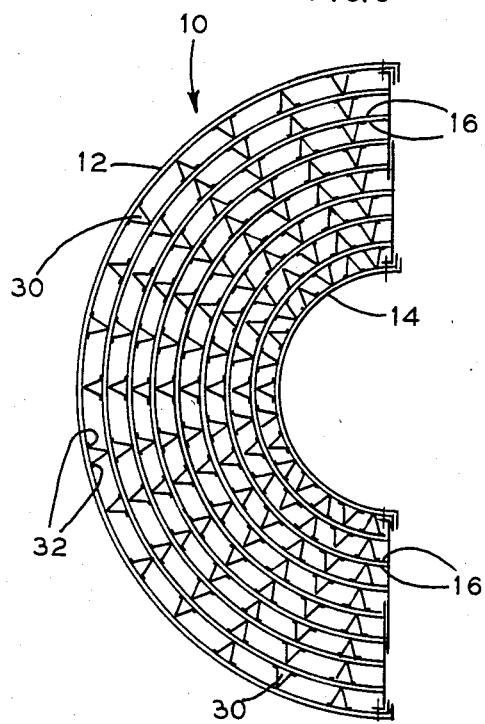
FIG. 3 is a sectional elevation taken along line 3—3 of FIG. 1, showing alignment of the channel V-spacers of the adjustment section.
Figure 4:
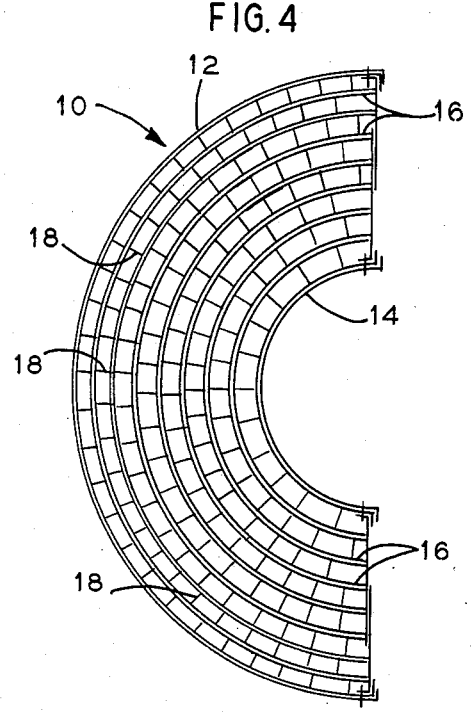
FIG. 4 is a sectional elevation taken along 4—4 of FIG. 1 showing alignment of the corrugated foil spacer strips that maintain spacing in the nonadjustable portion of the insulation.
Figure 5:
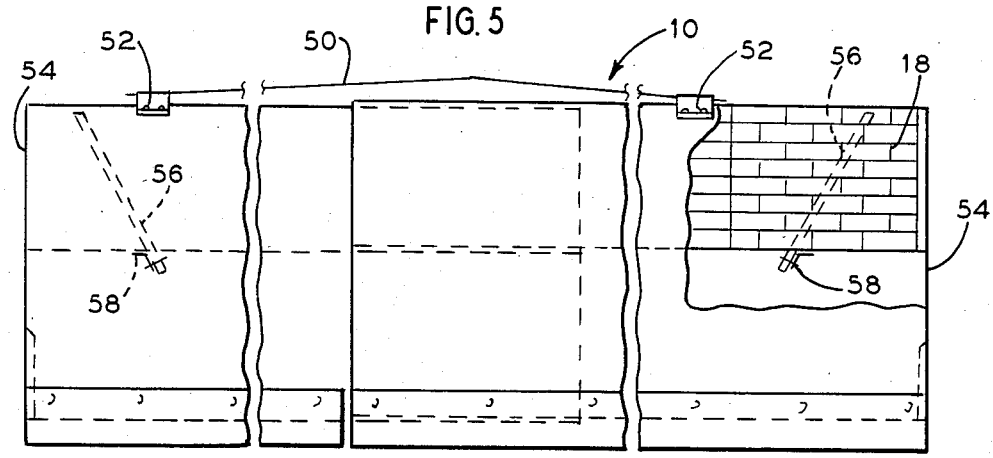
FIG. 5 is an elevation, partially in section, of the adjustable mirror insulation unit of FIG. 1, illustrating the adjustment restraining means that maintains alignment of respective layers and prevents pulling the unit apart.

FIG. 3 illustrates the inner relationships among channel V-spacers 30 in the preferred embodiment of pipe insulation shown in FIG. 1. FIG. 4 illustrates the conventional spacers used outside the adjustment portion of the embodiment illustrated in FIG. 1. When adjustable mirror insulation unit 10 is adjusted, there is a possibility that first section 19 and second section 21 can be pulled apart. It may be extremely difficult or impossible to put these sections together if this happens. A number of approaches to preventing this are possible. In a preferred embodiment, however, strap 50 is attached to outer case 12 at each end of strap 50 by fasteners such as rivets 52 so that strap 50 is slack when adjustable mirror insulation unit 10 is compressed, but becomes taut when adjustable mirror insulation unit 10 is expanded. A plurality of straps 50 may be deployed about the circumference of adjustable mirror insulation unit 10. Ends 54 of adjustable mirror insulation unit 10 are open, which can permit layers of insulation material to shift laterally relative to one another, thereby distorting the profile of ends 54, either in response to thermal expansion and contraction or in response to adjustment during installation. This possibility is eliminated by driving a plurality of liner rods 56, reflective sheets 16 and inner case 14, to which liner rods 56 are fixedly attached by riveting to clip 58, which is welded to inner case 14. Rod liners 56 have a ground pointed end that can be easily driven through the layers of insulation material.

Figure 6:
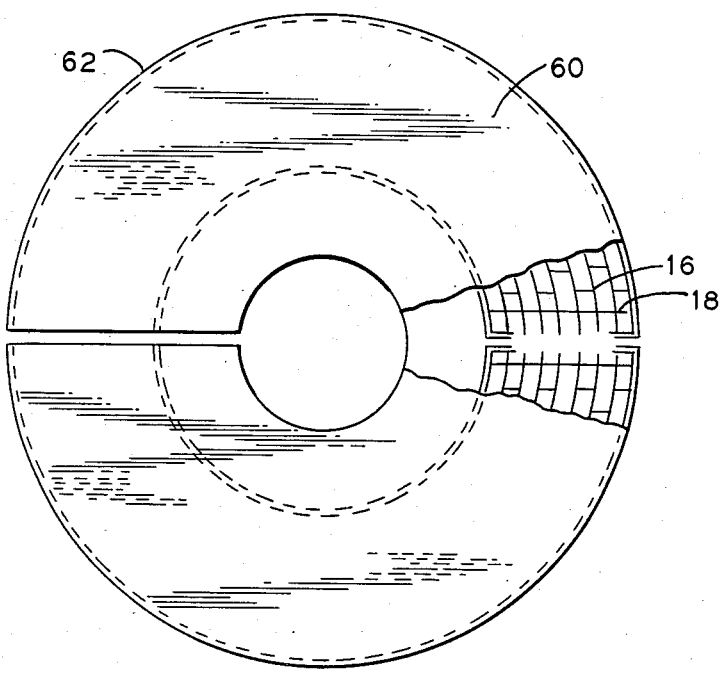
FIG. 6 is an end elevation, partially in section, of mirror insulation according to the present invention, illustrating an end cap for sealing the ends of the mirror insulation unit on a pipe.

Referring to FIG. 6, open ends 54 of adjustable mirror insulation unit 10 are sealed with end cap 60 which includes flange 60. Flange 60 is bent inwardly at a 90 degree angle throughout the circumference of end cap 60 and fits snugly over the outside surface of outer case 12, to which it may be welded. When ends 54 do not form the end of a pipe run, they abut an adjacent adjustable mirror insulation unit 10. The resulting joints are fastened together by a circumferential band (not shown) which may be welded to each adjustable mirror insulation unit.

The invention has been described with regard to a multilayer adjustable mirror insulation unit but it is apparent that the invention is applicable to any construction unit requiring adjustable multiple layers. It is apparent that variations and departures from the specific detailed embodiments described above may occur to those skilled in the art. Accordingly, the scope of the invention should not be limited to the detailed embodiments described above but should be measured by the claims that follow.

What is claimed is:

1. An improved adjustable multilayered thermal mirror insulation unit of the type having a first section and a second section; the first and second sections having open ends telescoped relative to each other and overlapping to define an adjustment zone; each of the first and second sections including an inner case, an outer case, and a plurality of reflective sheets mounted between the inner and outer cases in spaced parallel relationship, first and second spacer means mounted in fixed relationship between adjacent ones of the reflective sheets outside of the adjustment zone for maintaining the reflective sheets in said spaced parallel relationship; the improvement comprising an assembly wherein each of the reflective sheets of the first section has an end disposed between and spaced from two reflective sheets of the second section; a plurality of first spacer means attached to one surface of the reflective sheets of the first section; a plurality of second spacer means attached to one surface of the reflective sheets of the second section that is opposed to and spaced from the surface of the reflective sheets of the first section having the first spacer means; the second spacer means bearing against the opposed surface of the reflective sheets of the first section and the first spacer means bearing against the opposed surface of the reflective sheets of the second section; each of the second spacer means being located alternately between pairs of first spacer means, the first and second spacer means being located along the length of the adjustment zone in parallel relationship whereby ends of the first and second sections can telescopically move relative to each other.

2. An improved adjustable multilayered thermal mirror insulation unit as set forth in claim 1 wherein each of the inner and outer cases and reflective sheets comprises a curved shape.

3. An improved adjustable multilayered thermal mirror insulation unit as set forth in claim 2 wherein the curved shape comprises a portion of a cylinder.

4. An improved adjustable multilayered thermal mirror insulation unit as set forth in claim 1 wherein the outer case is of thicker material than the reflective sheets.

5. An improved adjustable multilayered thermal mirror insulation unit as set forth in claim 4 wherein the inner case is of a thicker material than the reflective sheets.

* * * * *